W. M. DONALDSON.
REGULATOR FOR FLUID COMPRESSORS.
APPLICATION FILED JULY 25, 1912.
1,138,199.
Patented May 4, 1915.
3 SHEETS—SHEET 3.
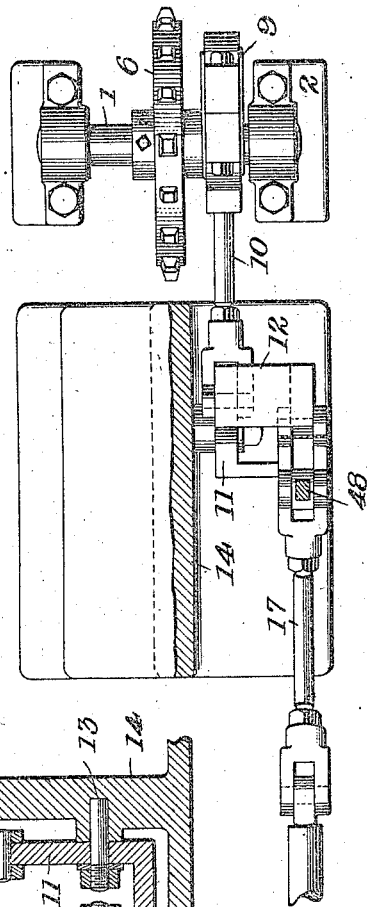
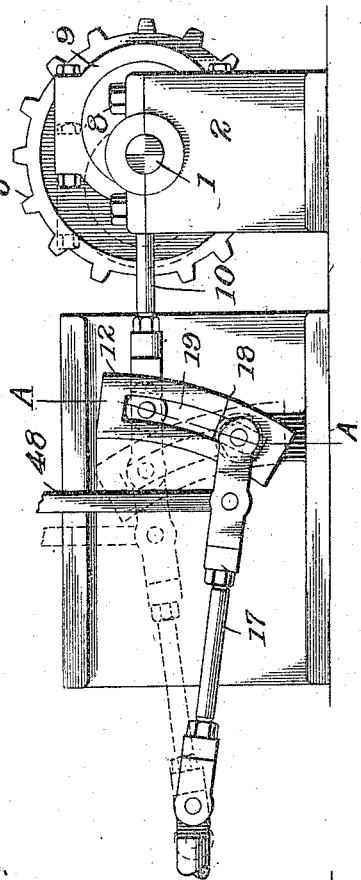
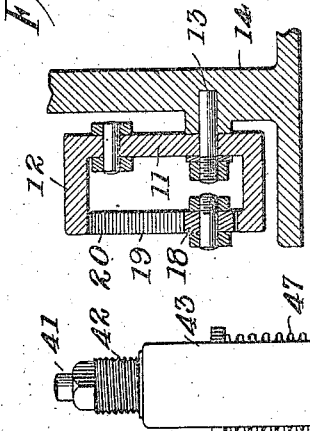
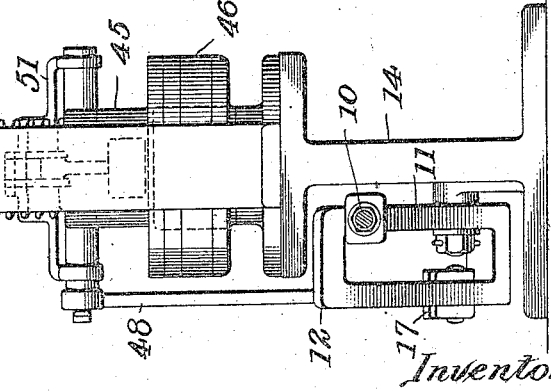
Witnesses.
Inventor:
William Macfarland Donaldson
by his attorneys

UNITED STATES PATENT OFFICE.

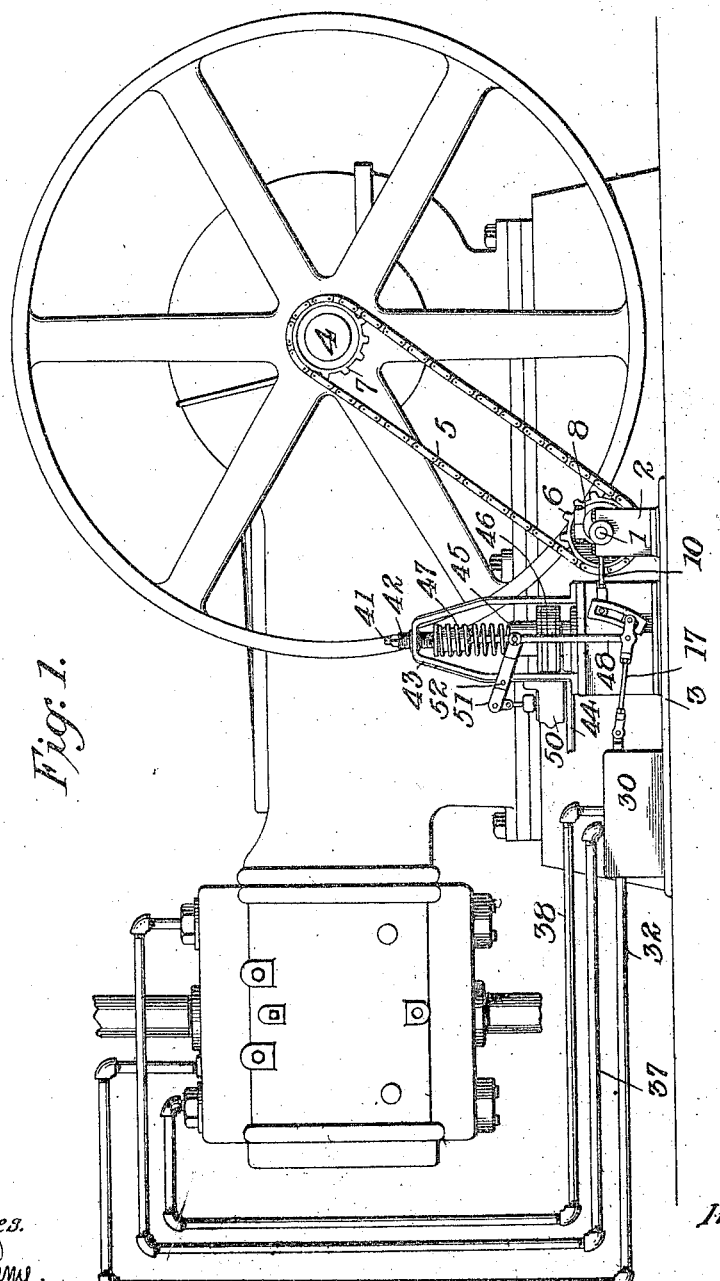

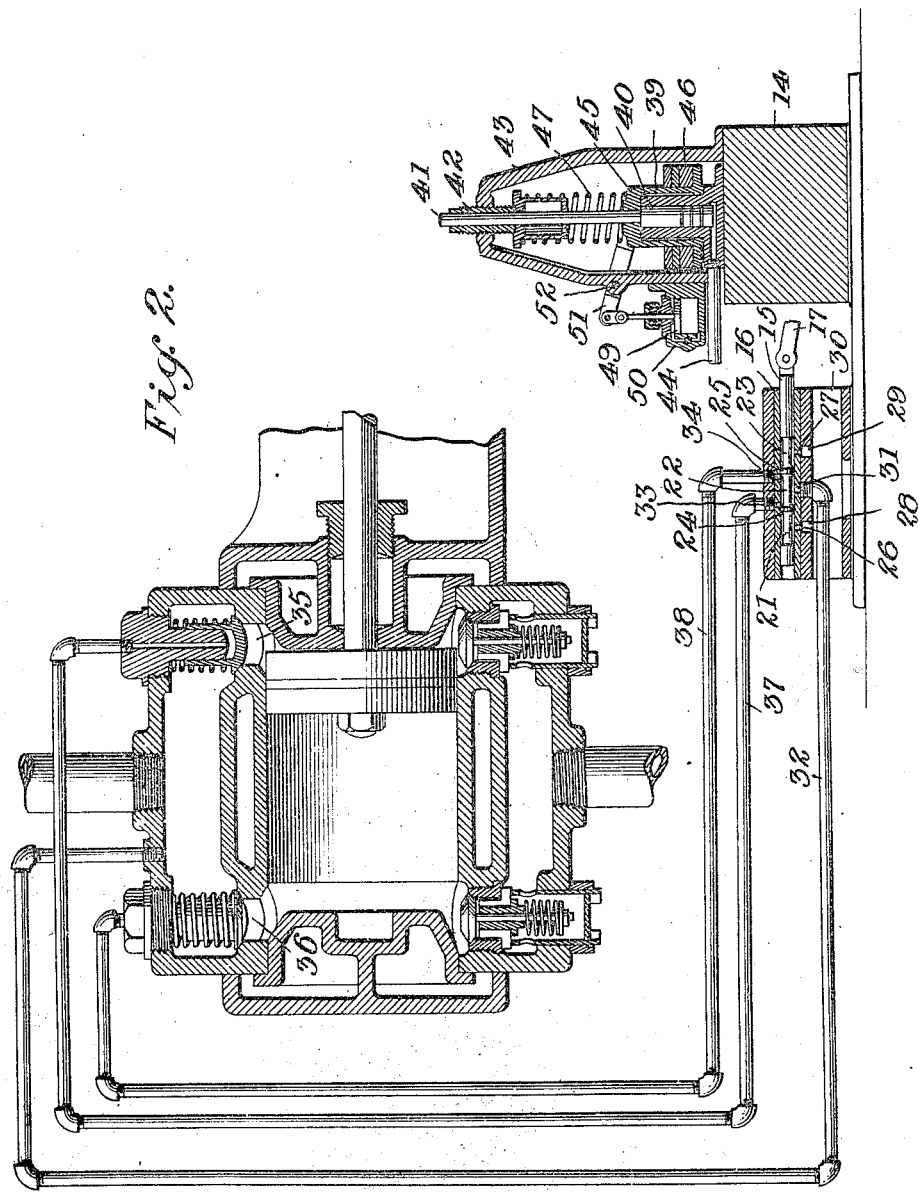

WILLIAM MACFARLAND DONALDSON, OF NEW YORK, N. Y., ASSIGNOR TO INGERSOLL-RAND COMPANY, OF NEW YORK, N. Y., A CORPORATION OF NEW JERSEY.

REGULATOR FOR FLUID-COMPRESSORS.

1,138,199.      Specification of Letters Patent.      Patented May 4, 1915.

Application filed July 25, 1912. Serial No. 711,561.

*To all whom it may concern:*

Be it known that I, WILLIAM MACFARLAND DONALDSON, a citizen of the United States, and resident of the borough of Manhattan, in the city and State of New York, have invented a new and useful Improvement in Regulators for Fluid-Compressors, of which the following is a specification.

The object of this invention is to provide means for regulating the amount of air delivered from a compressor while the compressor is permitted to run at a constant speed, the power consumed in driving the compressor being varied in proportion to the amount of air being delivered.

My invention consists in providing a regulator of novel form whereby the above stated object may be obtained by holding the discharge valves of the compressor open for different periods of the suction stroke according to the amount of air it is desired to deliver past them.

Some of the advantages which arise from the use of my novel regulator are, its simplicity and positiveness in action, with no delicate or complicated parts; its ready attachment to compressors now in use without expensive alterations; the elimination of the choking controller; the reduction in expense of operation; an equal efficiency at different loads; and the increase and decrease of the load in proportion to the amount of air required, with a constant speed of compressor and the control of the driving power.

The invention is shown and described herein in connection with a straight-line, power-driven compressor, of the single-stage, double-acting type, but it is to be understood that it may be applied to compressors of various types without departing from the spirit and scope of my invention.

In the accompanying drawings, Figure 1 is a view in side elevation, showing the regulator in connection with an air compressor of the single-stage, double-acting type, Fig. 2 is an enlarged vertical central section through the compressor cylinder and regulator, Fig. 3 is a still further enlarged end view of the regulator, Fig. 4 is a top plan view partly in section of certain of the parts, Fig. 5 is a side view of the same, and Fig. 6 is a detail section taken in the plane of the line A—A of Fig. 5.

The rotary shaft 1 of the regulator is mounted in suitable bearings 2 uprising from a base 3. This shaft 1 is driven from the crank shaft 4 of the compressor through a chain and sprocket connection 5, 6, 7, the sprockets being preferably of the same size. An eccentric 8 is fixed to the shaft 1 and it is connected by means of a strap 9 and rod 10 to the inner arm 11 of a rocking link 12 pivoted at 13 to a suitable frame 14 uprising from the base 3. A piston valve 15 slides in a valve seat 16 and is connected by a rod 17 to a block 18, which is movable in an elongated slot 19 in the outer arm 20 of the rocking link 12 toward and away from its axis 13. The valve 15 is provided with three reduced portions forming circumferential bridge ports 21, 22, 23, divided by the two faces 24, 25. The valve seat 16 is provided with two ports 26, 27, leading to external atmosphere through ports 28, 29, in the valve chest 30. This valve seat is further provided with an intermediate port 31 in constant communication with the discharge side of the compressor through a passage formed by the pipe 32, which pipe may lead to any desired point beyond the discharge valves of the compressor. The valve seat 16 is further provided with ports 33, 34, connected with the backs of the discharge valves 35, 36, of the compressor through passages formed by the pipes 37, 38.

The arrangement of the ports in the valve seat 16 and valve 15 is such that when the valve is in its position half-way between the limits of its movement both the discharge valves 35 and 36 have discharge pressure behind them by the open communication between the ports 31, 33, 34, and the central valve port 22. The faces 24, 25, of the valve 15 are so arranged that as the valve starts to move to the left, the face 25 will first cut off communication between the ports 31 and 34 and finally open the communication between the port 34 and exhaust port 27 through the valve port 23, thus releasing pressure from behind the discharge valve 35. As the valve moves to the right from its midway position, its face 24 will first cut off communication between the ports 33 and 31 and finally open the port 33 to the exhaust port 26 through the valve port 21, thus releasing pressure from behind the discharge valve 36.

The object of my invention is to provide means under the control of variations in fluid pressure for automatically releasing pressure from and applying pressure to behind the discharge valves for varying periods of time during the stroke of the compressor piston without changing the speed of the compressor piston, thus varying the capacity according to the requirement and also varying the power required to drive the compressor piston accordingly. This means for controlling the movement of the valve 15, is constructed, arranged and operated as follows. A vertically arranged cylinder 39 is mounted on the frame 14, within which cylinder is fitted a piston 40, its rod 41 sliding freely in a hollow guide sleeve 42, adjustable in a supplemental frame 43 uprising from the frame 14. The bottom of this piston 40 is at all times in open communication with receiver pressure through a passage formed by the pipe 44. This piston 40 carries a weight holder 45 which surrounds the cylinder 39 and is weighted to the desired extent by the weights 46. The movement of this holder 45 and thereby the piston 40 may be further retarded by means of a coil spring 47 interposed between the top of the holder 45 and the adjustable guide sleeve 42. The tension of this spring may be adjusted by adjustment of the said sleeve 42. This holder 45 is connected to the connecting rod 17 by a connecting rod 48 so that the block 18 to which the rod 17 is connected at the link 12 is moved along the slot 19 toward and away from the axis of said link by the movement of the piston 40 and holder 45. To prevent a too rapid movement of the holder in either direction, it is connected to the plunger 49 of a dash-pot 50 through a rock lever 51, pivoted at 52 to the supplemental frame 43.

When the parts are in their normal positions, the end of the valve connecting rod 17 at the link 12 is in alinement with the axis of said link so that the oscillatory movement of the link, due to its connection with the eccentric 8, will impart no movement to the valve 15 and the discharge valves 35, 36, of the compressor will consequently remain with pressure behind them and the compressor be permitted to compress its full amount of air and discharge it to the receiver.

After the receiver pressure has been raised to a predetermined point, any further raise in pressure will start the piston 40 of the regulator on its upward movement, thus raising the connection of the valve rod 17 with the link 12 away from alinement with the axis of said link and thereby causing reciprocation of the controlling valve 15. This reciprocation of the controlling valve due to the oscillation of the link and lifting of the regulator piston will automatically release pressure from behind the discharge valves 35, 36, thereby holding them open for a greater or lesser period of time, according to the distance which the regulator piston has raised the connection of the rod 17 with the link 12 away from the axis of the said link. It will be seen that this regulation is accomplished without interfering with the constant speed of the compressor. It will also be seen that this variation in the time of closing the discharge valves during this constant speed of the compressor piston, will, therefore, vary the power required to reciprocate said piston in proportion to said times of closing of the discharge valves. It will also be seen that by holding open the discharge valves, the air is given back to the compressor and is not lost. It will be seen that the parts may be adjusted so as to cause the closing of the discharge valves to be accomplished at various pressures. It is also preferable that a slight movement may be imparted to the controlling valve without affecting the time of closing of the discharge valves.

It is evident that a regulator of the character herein shown and described is applicable for use in connection with single or compound compressors, with duplication of such parts as may be necessary for accomplishing the results above numerated.

What I claim is:—

1. In combination, a fluid compressor, its piston, means of driving it, a discharge valve and fluid pressure controlled means for automatically applying fluid pressure to and releasing the fluid pressure from behind the discharge valve for loading and unloading it for varying periods of time during the stroke of the piston.

2. In combination, a fluid compressor, its piston, means of driving it, a discharge valve and means controlled by variations in pressure for automatically applying fluid pressure to and releasing the fluid pressure from behind the discharge valve for loading and unloading it for varying periods of time during the stroke of the piston.

3. In combination, a fluid compressor, its piston, means of driving it, a discharge valve and fluid pressure controlled means for automatically applying fluid pressure to and releasing the fluid pressure from behind the discharge valve for loading and unloading it for varying periods of time during the stroke of the piston without changing the speed of the piston.

4. In combination, a fluid compressor, its piston, means of driving it, a discharge valve and means controlled by variations in pressure for automatically applying fluid pressure to and releasing the fluid pressure from behind the discharge valve for loading and unloading it for varying periods of time during the stroke of the piston without changing the speed of the piston.

5. In combination, a fluid compressor, its piston, means of driving it, a discharge valve normally having pressure behind it, and fluid pressure controlled means for automatically releasing the pressure and holding open the discharge valve for varying periods of time during the stroke of the piston.

6. In combination, a fluid compressor, its piston, means of driving it, a discharge valve, and fluid pressure controlled means for automatically applying fluid pressure to and releasing the fluid pressure from behind the discharge valve for varying the quantity of fluid delivered by the compressor and varying the power consumed by the compressor piston driving means in proportion to the fluid delivered.

7. In combination, a fluid compressor, its piston, means of driving it at a constant speed, a discharge valve, and fluid pressure controlled means for automatically applying fluid pressure to and releasing the fluid pressure from behind the discharge valve for varying the quantity of fluid delivered by the compressor and varying the power consumed by the compressor piston driving means in proportion to the fluid delivered.

8. In combination, a fluid compressor, its driving means, a discharge valve and a controlling valve therefor connected to the driving means for holding open and closing the discharge valve under predetermined conditions.

9. In combination, a double-acting fluid compressor, its driving means, discharge valves and a controlling valve therefor connected to the driving means for alternately holding open and closing the discharge valves under predetermined conditions.

10. In combination, a fluid compressor, its piston, means of driving it, a discharge valve, a controlling valve therefor connected to the piston driving means and means for varying the throw of the controlling valve to hold open the discharge valve for varying periods of time during the stroke of the piston.

11. In combination, a double-acting fluid compressor, its piston, means of driving it, discharge valves, a controlling valve therefor connected to the piston driving means, and means for varying the throw of the controlling valve to alternately hold open the discharge valves for varying periods of time during the strokes of the piston.

12. In combination, a fluid compressor, its piston, means of driving it, a discharge valve, a controlling valve therefor connected to the piston driving means, and fluid pressure operated means for varying the throw of the controlling valve to hold open the discharge valve for varying periods of time during the stroke of the piston.

13. In combination, a double-acting fluid compressor, its piston, means of driving it, discharge valve, a controlling valve therefor connected to the piston driving means, and fluid pressure operated means for varying the throw of the controlling valve to alternately hold open the discharge valves for varying periods of time during the strokes of the piston.

In testimony that I claim the foregoing as my invention, I have signed my name in presence of two witnesses, this 23rd day of July 1912.

WILLIAM MACFARLAND DONALDSON.

Witnesses:
FRED T. OVERTON,
PHILIP BURWELL GOODE.